United States Patent [19]

Arato et al.

[11] Patent Number: 5,653,890
[45] Date of Patent: Aug. 5, 1997

[54] BICYCLE STORAGE SYSTEM

[75] Inventors: Paul T. Arato, Willowdale; F. William Coffman, Toronto, both of Canada

[73] Assignee: Arato Design Associates Inc., Canada

[21] Appl. No.: 448,802

[22] Filed: May 24, 1995

[30] Foreign Application Priority Data

May 24, 1994 [CA] Canada ................... 2124129

[51] Int. Cl.⁶ ........................................ A47F 7/00
[52] U.S. Cl. ..................... 211/5; 211/18; 70/58; 70/233
[58] Field of Search ................. 211/5, 17, 18, 211/19; 248/551, 552, 553, 309.1, 315, 316.8; 70/58, 233

[56] References Cited

U.S. PATENT DOCUMENTS

| 4,676,080 | 6/1987 | Schwarz | 70/58 X |
| 5,238,125 | 8/1993 | Smith | 211/19 X |
| 5,291,765 | 3/1994 | Hoisington | 70/233 |
| 5,476,203 | 12/1995 | Fletcher | 211/5 |

*Primary Examiner*—Robert W. Gibson, Jr.
*Attorney, Agent, or Firm*—Baker & Daniels

[57] ABSTRACT

A storage mount for a bicycle includes a generally U-shaped raceway to receive the hasp of a conventional U-shaped lock. The raceway includes a mounting flange which is attached to a support surface prior to receiving a lock hasp. The lock hasp is inserted into the raceway and rotated ninety degrees at which point it is prevented from further rotation allowing a bicycle to be supported thereon and a lock to be fastened to the hasp.

6 Claims, 6 Drawing Sheets

BICYCLE STORAGE SYSTEM

BACKGROUND OF THE INVENTION

1. Field of the Invention

The present invention relates to a novel bicycle storage system. More specifically, the present invention relates to a bicycle storage mount which, in combination with a U-hasp lock, forms a convenient and secure means to store a bicycle.

2. Description of the Prior Art

Bicycling is again enjoying a surge of popularity with many varieties of bicycle being popular, including racing, touring and mountain (trail) bicycles. One of the problems facing many bicyclists is that of finding a safe and/or convenient method of storing their bicycles when not in use. Conventional means for storing bicycles range from leaning a bicycle against a wall, to kickstands mounted on the bicycle, to racks in which one wheel of the bicycle is placed or to hooks from which the bicycle is hung.

Each of the above-mentioned conventional storage techniques suffers from one or more disadvantages including the fact that the stored bicycle may be occupying floor space which could otherwise be usefully employed, the difficulty in placing the bicycle in storage and removing it therefrom and, perhaps most importantly, the low degree of security which is available to prevent theft of the bicycle. As high performance bicycles may be very expensive, bicycle theft is becoming increasingly common and prior art storage techniques do not provide secure, efficient storage of bicycles.

SUMMARY OF THE INVENTION

It is an object of the present invention to provide a novel bicycle storage system which obviates or mitigates at least one of the above-mentioned disadvantages of prior art bicycle storage techniques.

According to one aspect of the present invention, there is provided a bicycle storage system comprising: a hasp; a lock means operable to engage said hasp in a locked manner; a storage mount including means to mount said storage mount to a support surface; means to removably receive said hasp in said storage mount such that at least a portion of said hasp extends substantially normal to said support surface to receive a portion of a bicycle frame or the like, said hasp preventing access to said means to mount and wherein when said lock engages said hasp said bicycle frame is secured to said support surface.

According to another aspect of the present invention, there is provided a storage mount for a bicycle and the like comprising: a first surface operable to abut a support surface and including means to receive means to fix said first surface to said support surface; a raceway extending from said first surface, said raceway operable to removably receive a hasp of a lock such that at least a portion of said hasp is maintained substantially horizontal by said raceway to allow a portion of a bicycle frame to be placed thereon and a lock attached to said hasp to prevent removal of said bicycle frame and wherein said hasp prevents access to said means to fix.

According to yet another aspect of the present invention, there is provided a storage mount for a bicycle and the like comprising: a mounting flange to abut a support surface and including at least one aperture to receive means to fix said flange to said support surface; a raceway extending from said flange, said raceway operable to receive a hasp of a lock in a first position and to allow said hasp to be rotated to a second position wherein continued rotation of said hasp is prevented and removal of said hasp is inhibited, said hasp being substantially horizontal in said second position to allow a portion of a bicycle frame to be placed thereon and wherein a lock attached to said hasp prevents removal of said bicycle frame from said support surface.

BRIEF DESCRIPTION OF THE DRAWINGS

A preferred embodiment of the present invention will be described, by way of example only, with reference to the accompanying drawings, in which.

DETAILED DESCRIPTION OF THE PREFERRED EMBODIMENTS

Figure 1:
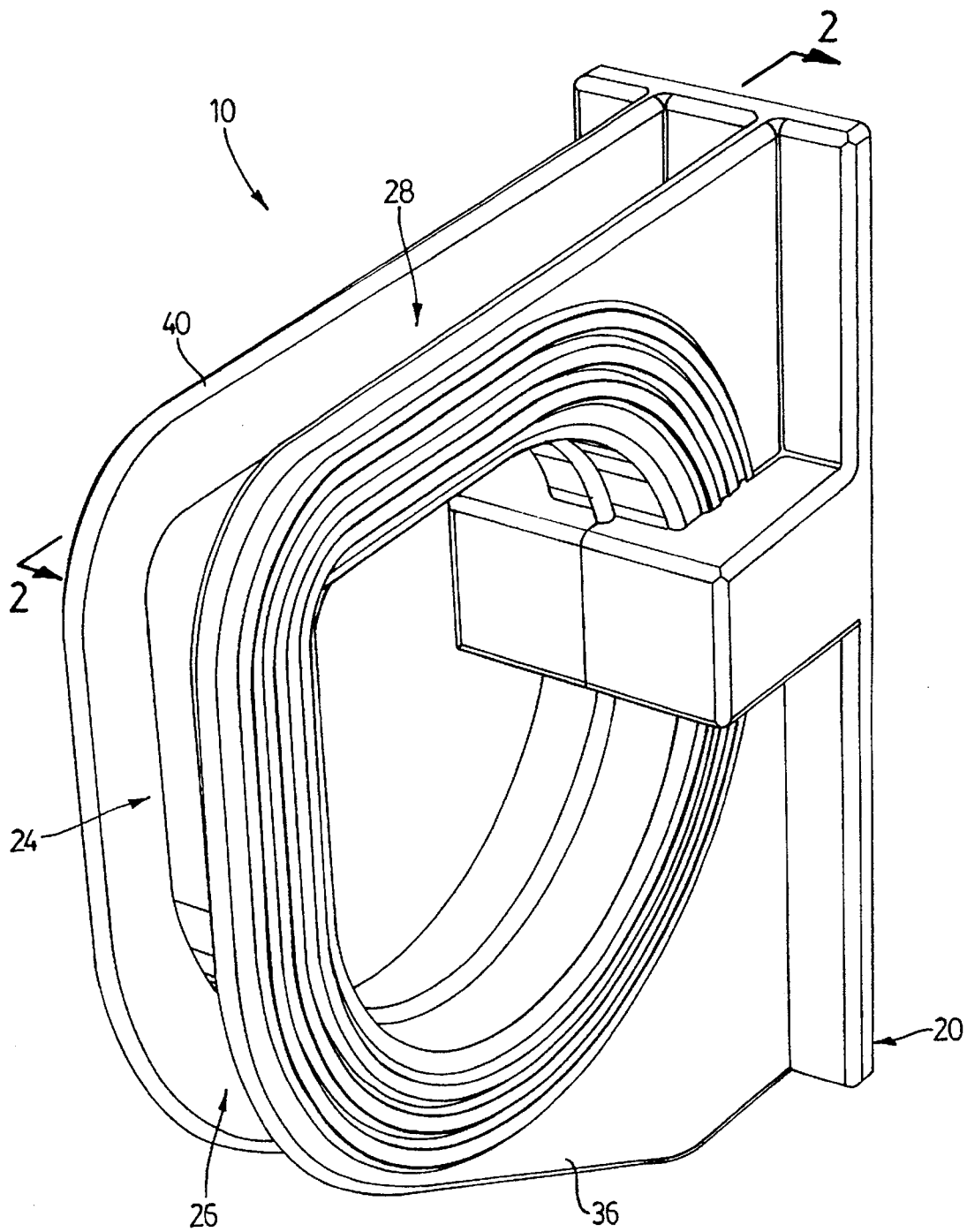
FIG. 1 shows a perspective view of the front and side of a storage mount in accordance with the present invention.

A storage mount in accordance with the present invention is indicated generally in FIG. 1 at 10. Storage mount 10 may be fabricated from polyurethane or other suitable materials and includes a mounting flange 20 and a raceway 24 which is defined between walls 36 and 40. Raceway 24 includes a generally U-shaped portion 26 and a crosspiece 28 extending between the ends of the arms of the U-shaped portion of the raceway distal the bight of the 'U'. The cross-section of raceway 24 is also generally U-shaped and is sized to accept the hasp of a conventional U-lock, as described below.

Figure 2:
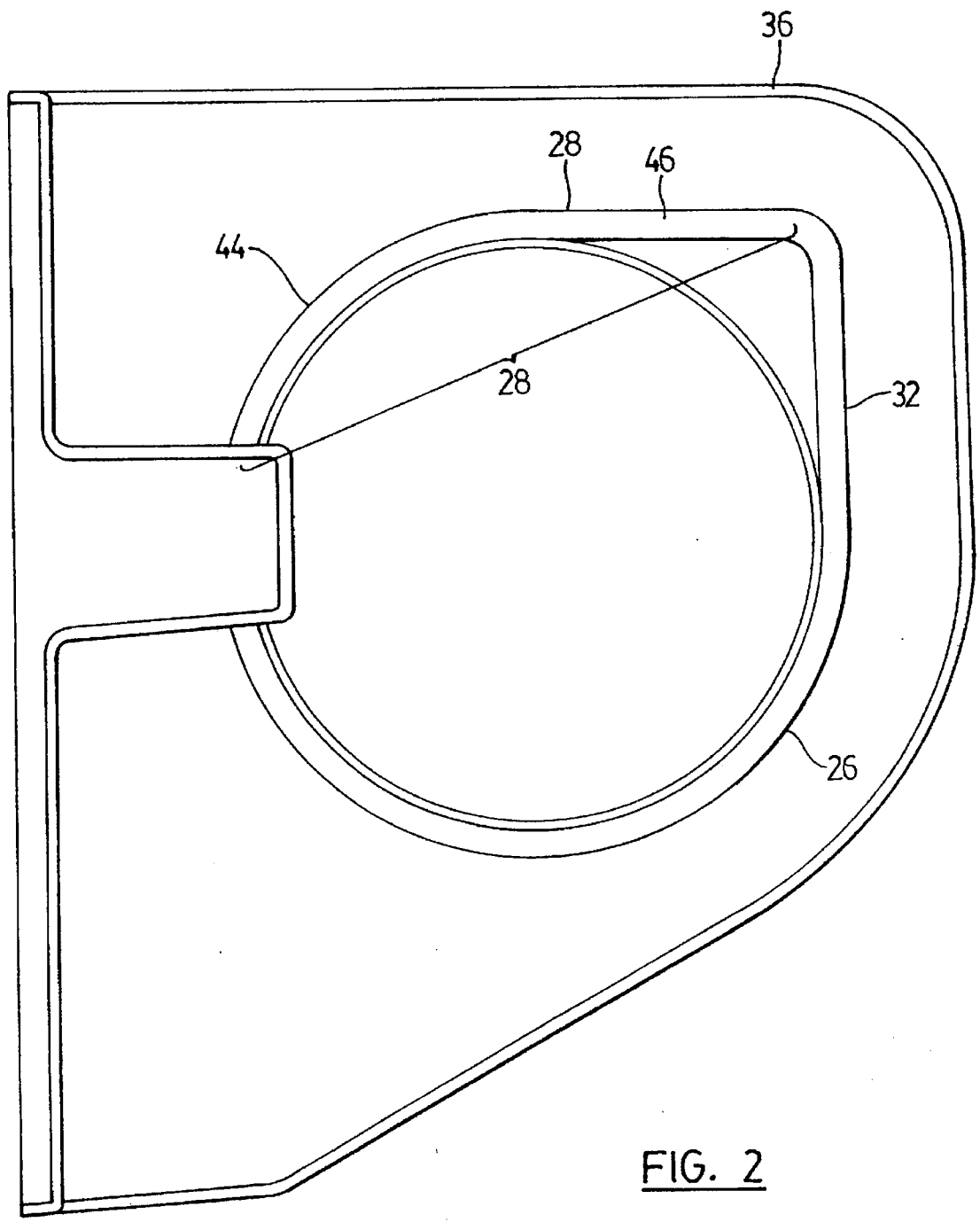
FIG. 2 shows a section taken along line 2—2 of FIG. 1.

FIG. 2 shows base wall 32 which, in combination with walls 36 and 40 defines raceway 24. As shown in FIG. 2, the portion 44 of crosspiece 28 adjacent mounting flange 20 is radiused from the arm of the U into the straight portion 46 of crosspiece 28. As will be described below, this allows the hasp of a U-lock to be inserted into raceway 24 and rotated ninety degrees.

Figure 3:
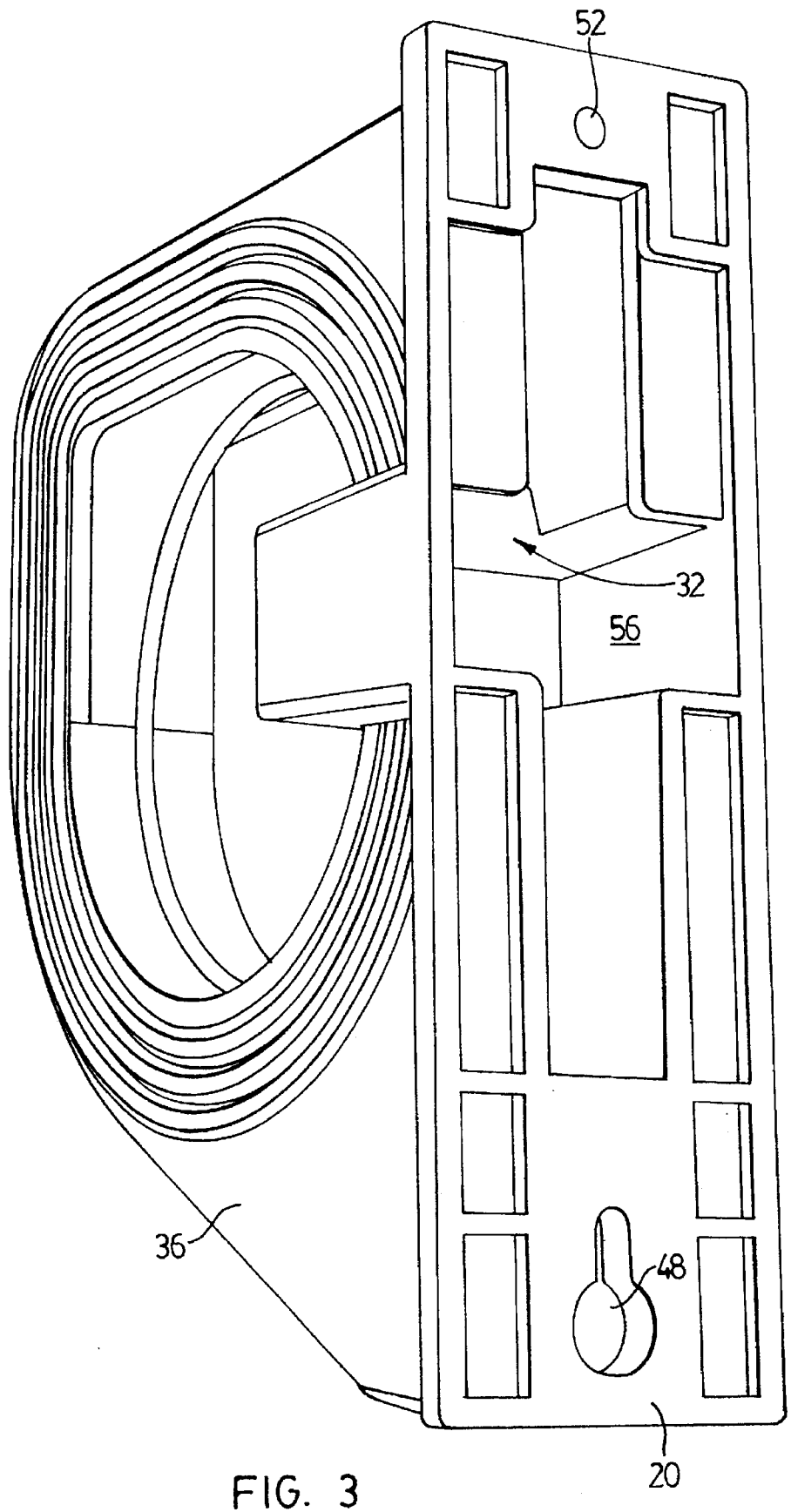
FIG. 3 shows a perspective view of the back and side of the storage mount of FIG. 1.

As shown in FIG. 3, mounting flange 20 includes a key-hole mounting aperture 48 and a second mounting aperture 52. Mounting flange 20 also includes a receptacle 56 for a security mount discussed below.

In its simplest form, storage mount 10 is fixed to a support surface, such as a wall or beam, by fixing a suitable mounting screw to the support surface and inserting the head of the mounting screw through the larger portion of keyhole aperture 48. Storage mount 10 is then moved to force the mounting screw into the slot portion of key-hole aperture 48. Next, another suitable mounting screw is fixed to the support surface through mounting aperture 52, fixing storage mount 10 to the support surface.

Figure 4:
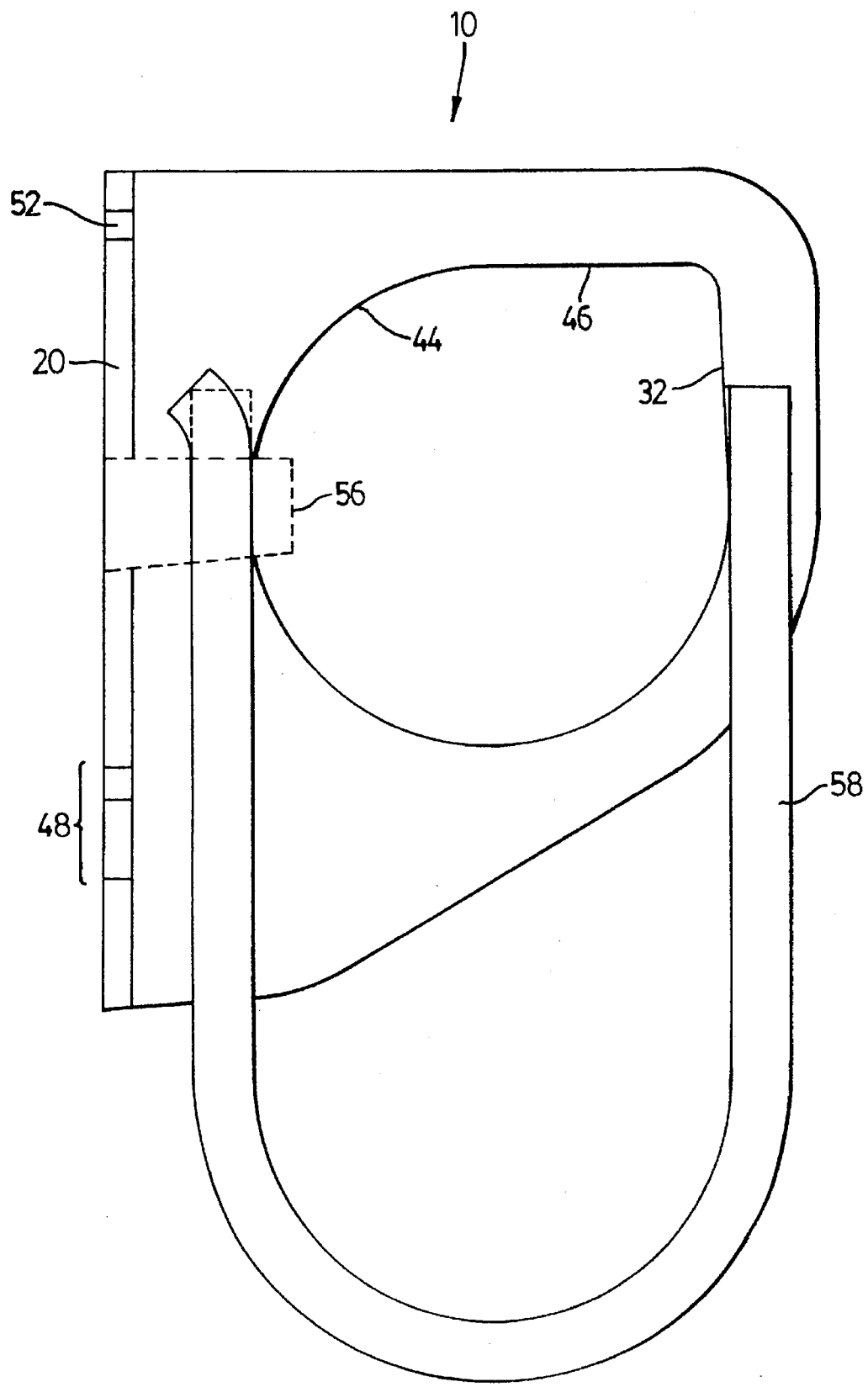
FIG. 4 shows the section of FIG. 2 wherein a hasp of a lock is being inserted.
Figure 5:
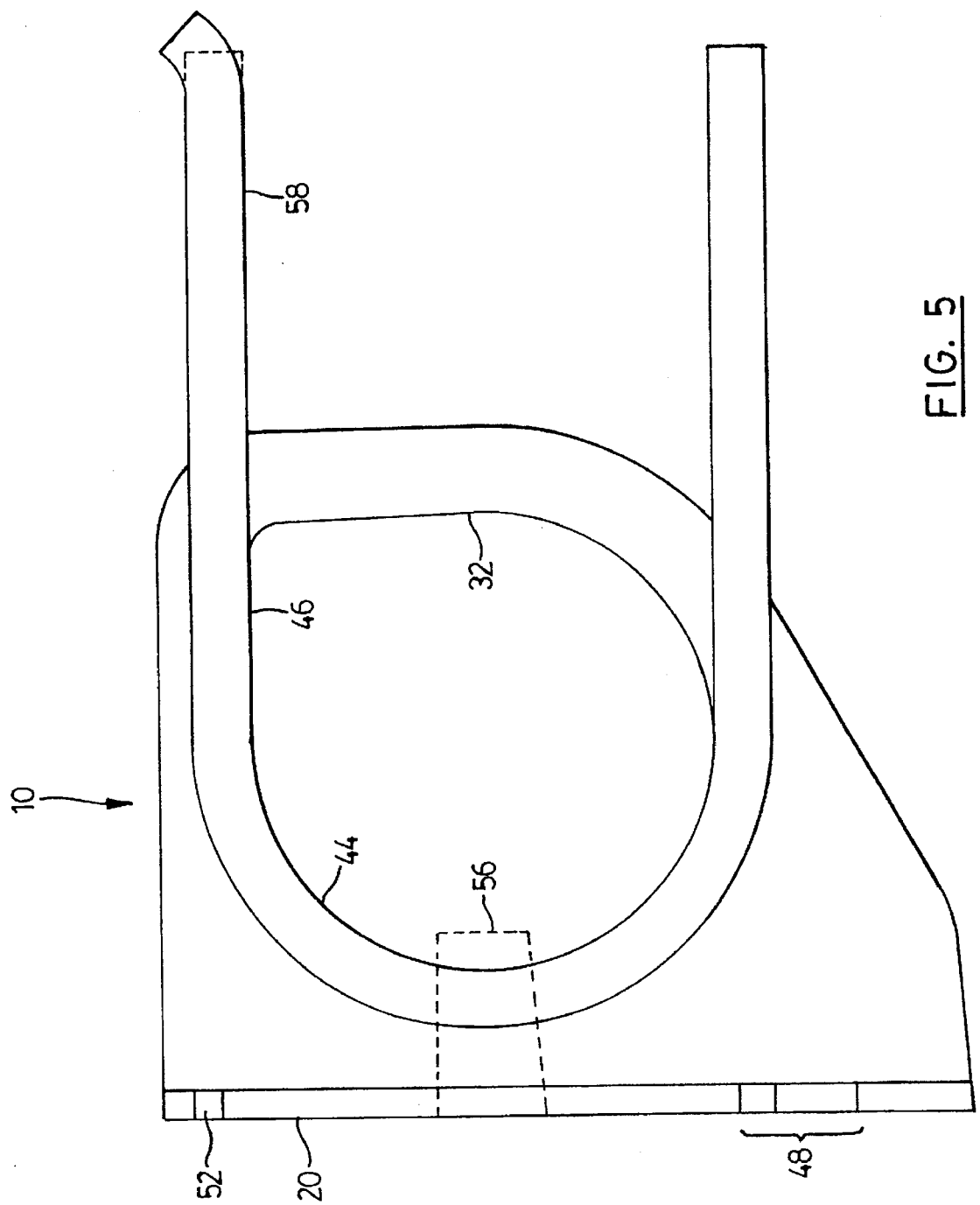
FIG. 5 shows the section of FIG. 4 wherein the hasp has been rotated to its support position.

Once storage mount 10 is properly fixed to a support surface, the hasp 58 of a conventional bicycle U-lock, such as those sold under the 'Kyrptonite' trademark, is inserted into raceway 24 as shown in FIG. 4. When hasp 58 has been inserted to the point where the bight of hasp 58 abuts the bight of U-shaped portion 26, hasp 58 is rotated approximately ninety degrees to the position shown in FIG. 5. As shown in the Figure, straight portion 46 of cross-piece 28 abuts the arm of hasp 58 such that further rotation of hasp 58 is prevented. It should be noted that, in this position, access to the screws in mounting apertures 48 and 52 is prevented by hasp 58, inhibiting removal of storage mount 10 from the support surface.

At this point, the frame of the bicycle to be stored is placed over one arm of the hasp and the lock is fastened to the hasp in the conventional manner securing the bicycle to storage mount 10. When the bicycle is to be removed, the lock is opened and the bicycle is removed. If desired, the hasp may also be removed from storage mount 10 by rotating the hasp back ninety degrees and drawing it down and out of storage mount 10. In this manner, the U-lock may still be used to lock the bicycle in the conventional manner at other locations.

As mentioned above, when rotated to the position shown in FIG. 5, hasp 58 is prevented from further rotation and will support the weight of a bicycle on hasp 58. Thus, by mounting storage mount 10 at a height above ground, a bicycle can be lifted and placed on hasp 58 to conveniently and securely store the bicycle at a height above the floor to free up floor space. It is contemplated that where two or more bicycles are to be stored, a first storage mount would be located at a height which allows a first bicycle to rest on the ground while locked to the mount and a second storage mount would be located above the first storage mount at a height which allows the second bicycle to be suspended above the first bicycle when the second bicycle is locked to the second storage mount.

Storage mounts 10 may be installed in apartment garages, office building garages etc. for convenient use by cyclists who need only have a U-lock with them to securely store their bicycles and such storage may make efficient use of available space by allowing for bicycles to be stored in vertically spaced arrangements.

Figure 6:
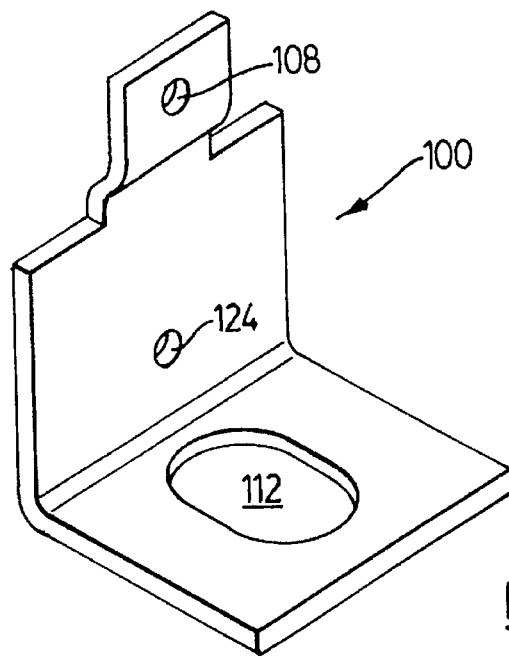
FIG. 6 shows a security mount for use with the storage mount of FIG. 1.
Figure 7:
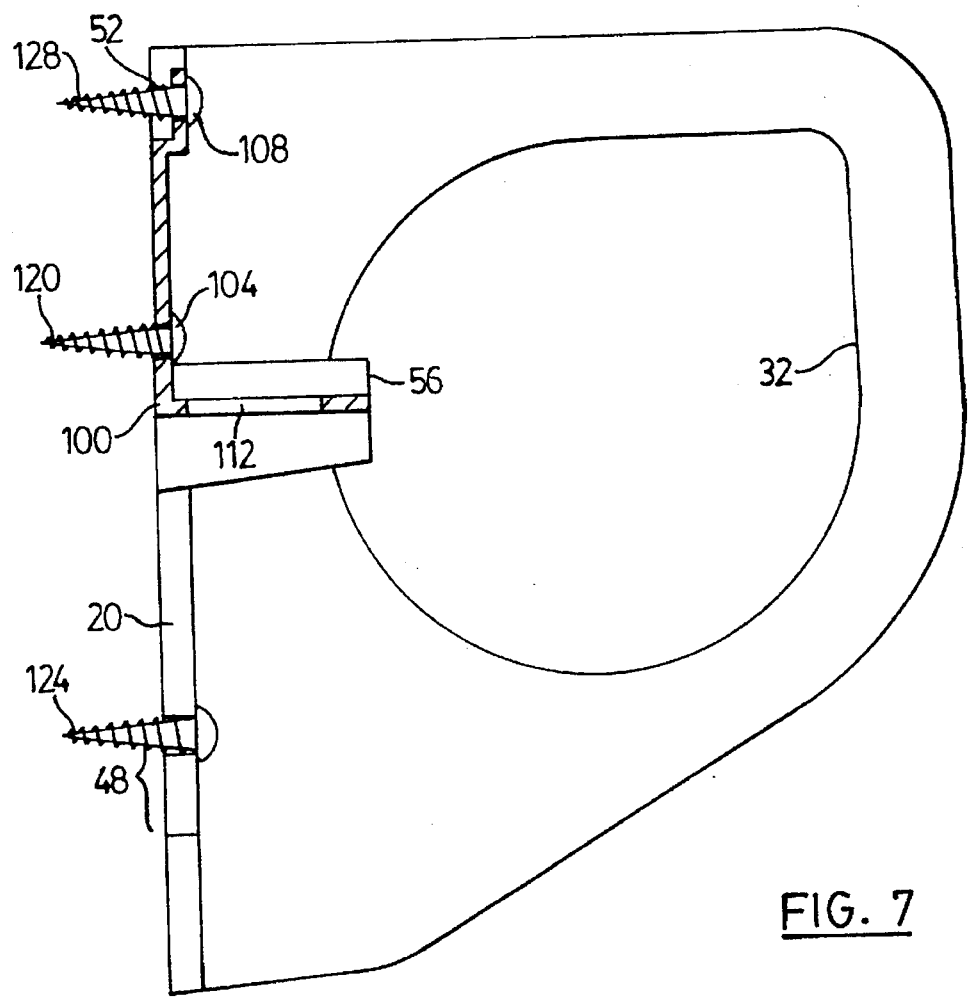
FIG. 7 shows the section of FIG. 2 with the security mount of FIG. 6 in place.

FIG. 6 shows a security mount 100 which may be employed with storage mount 10, as shown in FIG. 7, to increase the degree of security provided by storage mount 10. In use, security mount 100 is mounted to a support surface, prior to storage mount 10, by fixing a suitable mounting screw 120 to the support surface through mounting aperture 104. A second suitable mounting screw 124 is then fixed to the support Surface and storage mount 10 is placed over security mount 100, such that security mount 100 is received in receptacle 56 with the second mounting screw being located in the larger portion of aperture 48. Storage mount 10 is then moved to force the mounting screw into the slot portion of key-hole aperture 48 which results in mounting aperture 52 aligning with mounting aperture 108 in security mount 100. At this point, a third suitable mounting screw 128 is fixed to the support surface through mounting aperture 52.

With security mount 100 in place, when a lock hasp is inserted into raceway 24 one arm of the hasp passes through locking aperture 112 in security mount 100. Security mount 100 is fabricated from a material, such as hardened steel, to provide extra strength mounting strength and to enhance the security provided by storage mount 10.

While the description above refers to mounting screws, it will be apparent to those of skill in the art that any suitable mounting means may be employed without departing from the scope of the invention. For example, it is contemplated that municipalities may permanently attach storage mount 10 and/or security mount 100 (if present) to lamp posts, parking meter stanchions and the like by threaded studs welded to the post or stanchion or by metal straps, etc.

The above-described embodiments of the present invention are not intended to be limiting and variations and modifications may occur to those of skill in the art without departing from the present invention as defined be the claims appended hereto.

What is claimed is:

1. A bicycle storage system comprising:

a hasp;

a lock means operable to engage said hasp in a locked manner;

a storage mount including means to mount said storage mount to a support surface;

means to removably receive said hasp in said storage mount such that at least a portion of said hasp extends substantially normal to said support surface to receive a portion of a bicycle frame or the like, said hasp preventing access to said means to mount and wherein when said lock engages said hasp said bicycle frame is secured to said support surface.

2. A bicycle storage system as claimed in claim 1 further comprising:

security mount including an aperture to receive said hasp, said security mount operable to be mounted to said support surface in addition to and prior to said storage mount, said storage mount encompassing said security mount when mounted to said support surface such that when said hasp is received in said storage mount, said hasp passes through said aperture.

3. A bicycle storage system as claimed in claim 2 wherein said security mount is fabricated of steel.

4. A bicycle storage system as claimed in claim 2 wherein said hasp is generally U-shaped and said means to receive said hasp comprises a substantially U-shaped raceway with a cross-piece extending between the ends of the arms opposite the bight of the raceway, the plane of the U-shaped raceway being normal to the plane of said support surface, one arm of said U-shaped raceway being adjacent said support surface and said crosspiece including a radiused connection to said adjacent arm such that said hasp may be inserted into said raceway with the arms of the hasp parallel the arms of the raceway until the bight of the hasp abuts the bight of the raceway, at which point the hasp may be rotated substantially ninety degrees about said raceway such that said arms of said hasp extend substantially normal to the plane of the support surface, further rotation of the hasp being prevented by an arm of the hasp abutting the crosspiece.

5. A storage mount for a bicycle and the like comprising:

a mounting flange to abut a support surface and including at least one aperture to receive means to fix said flange to said support surface;

a raceway extending from said flange, said raceway operable to receive a hasp of a lock in a first position and to allow said hasp to be rotated to a second position wherein continued rotation of said hasp is prevented and removal of said hasp is inhibited, said hasp being substantially horizontal in said second position to allow a portion of a bicycle frame to be placed thereon and wherein a lock attached to said hasp prevents removal of said bicycle frame from said support surface.

6. A storage mount as claimed in claim 5 wherein access to said at least one aperture is prevented when said hasp is in said second position.

* * * * *